Nov. 2, 1965    W. B. ANDERSON    3,215,448
LOW-VEHICLE STRADDLING LUGGAGE CARRYING TRAILER
Filed Oct. 2, 1962

INVENTOR.
WILLIAM BENJAMIN ANDERSON
BY
ATTORNEYS.

3,215,448
TOW-VEHICLE STRADDLING LUGGAGE
CARRYING TRAILER
William Benjamin Anderson, 69 Kennedy Road,
Napier, Hawke's Bay, New Zealand
Filed Oct. 2, 1962, Ser. No. 227,925
Claims priority, application New Zealand, Oct. 6, 1961,
130,386
6 Claims. (Cl. 280—400)

This invention relates to an improved trailer for attachment to motor vehicles and the like.

The previously known forms of trailers usually consist of an axle having a pair of road wheels, and a tray attached to the axle, the tray having a draw bar for connection to the rear of the motor vehicle by which the trailer is to be towed. Although this system is quite satisfactory in a lot of applications, nevertheless there are occasions when such trailers exhibit severe disadvantages. Instances of these occasions are, for instance, the possibility of jack-knifing should the trailer get out of control during heavy braking by the towing vehicle, and also especially when the trailer is being reversed this requiring considerable experience on the part of the driver to perform the operation satisfactorily. Another disadvantage of the known forms of trailers is that to conform with traffic regulations the size of the tray is necessarily restricted so that the amount of material which can be transported on the trailer is limited.

By this invention an improved form of trailer has been designed in which the possibility of jack-knifing has been eliminated and which can if necessary carry comparatively heavy or bulky loads. The trailer is designed so that it can be attached to the front of the towing vehicle by a usual ball and socket joint and so that it will extend on either side of the motor vehicle to provide a luggage carrying space which can be either above or behind the vehicle. Means are also provided to retain the rear of the trailer in constant spatial relationship with the motor vehicle so that the trailer will remain parallel with the vehicle but have up and down movement independent thereof.

The invention comprises an improved trailer consisting of a carrier frame and a towing frame supported by ground wheels, the said towing frame projecting to the front of the vehicle where it is pivotally attached to the said vehicle, there being means attachable to the rear of the vehicle and to a point intermediate of the length of the trailer to retain the trailer in a predetermined lateral position in relation to the towing vehicle.

The invention will now be described with the aid of the accompanying drawings in which.

Figure 1:
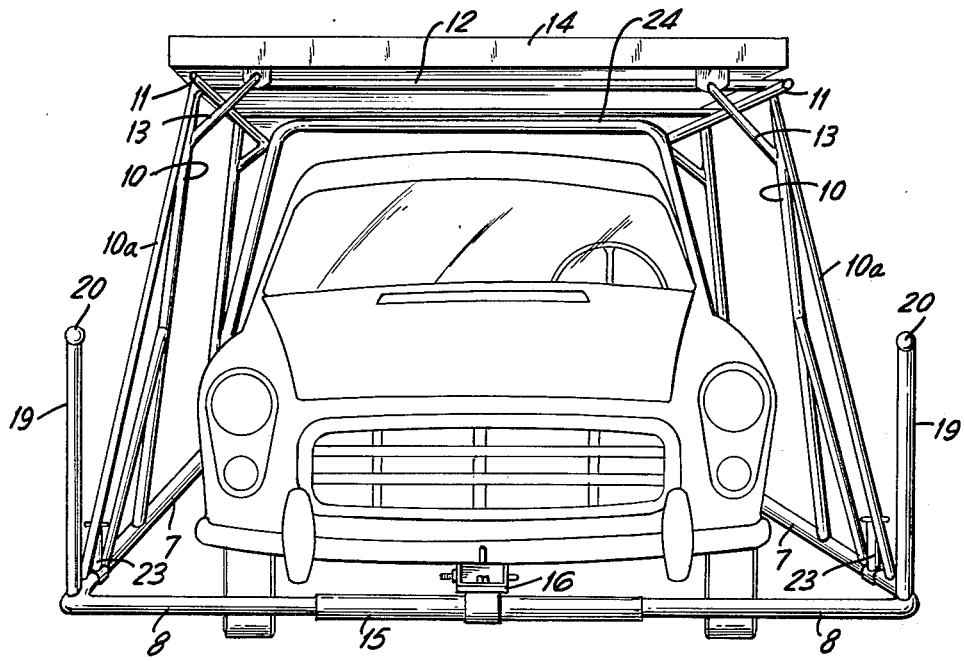
FIGURE 1 is a view from the front showing the trailer connected to a motor vehicle and FIGURE 2 is a view from the side of the trailer and motor vehicle shown in FIGURE 1.

Referring to the drawings, the trailer has a towing frame constructed of, for instance, tubular steel, having side rails 7 and front and rear cross members 8 and 9. Upright support members 10 project from each side rail 7 and are connected to an upper side rail 11 which forms one part of a carrier frame. Transverse cross members 12 join the two upper side rails 11 together to complete the carrier frame with suitable gussets or braces 13 fastened between the upright support members 10 and the transverse cross members 12. A platform or tray 14 is suitably attached to the carrier frame. Suitable braces, such as those referenced at 10a may also be incorporated to improve the rigidity of the trailer.

A sleeve 15 is engaged on the front cross member 8 to strengthen such member. At or about the mid point of the member 15 a trailer hitching socket 16 is attached so as to project rearwardly for connection to the usual form of ball joint which will project from and be suitably attached to the front of the vehicle.

Road wheels 18 are attached to the side rails of the trailer through suitable suspension means (not shown in the drawings), the positioning of the road wheels being preferably so that they will normally be in or about the same axial relationship as the rear wheels of the motor vehicle. In such a manner the wheels will not interfere with the opening or closing of the doors of the said vehicle. A yoke 24 which preferably passes over the top of the motor vehicle and which is attached to the underside of the carrier frame is also attached to the side rails 7 of the trailer to minimize any torsional movements of the said trailer.

Figure 3:
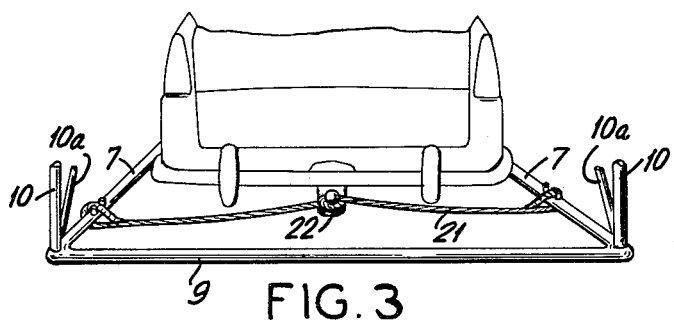
FIGURE 3 is a view of detail showing the method of attaching the rear of the vehicle to the trailer.

The rear of the trailer is stabilized to prevent the side of the vehicle from coming into contact with the side of the trailer, for instance, when the vehicle is executing a turn with the trailer in tow. Various means can be employed to overcome this, one such means being in the form of a panhard rod (not shown in the drawings) which extends from a universal joint such as a ball and socket joint attached to the rear of the vehicle and preferably to one side thereof, the said rod passing across the centre line of the trailer and being pivotally connected to the side rail 7 of the trailer opposite the connection of the rod to the vehicle. Another means of stabilizing the rear of the trailer is as shown in FIGURE 3 whereby a flexible link which can be in the form of chain or wire rope 21 is attached between the side rails 7 of the trailer and the rear of the motor vehicle. As can be seen from the figure either end of the rope is attached to the side rails 7 and the centre of the rope is hitched around a ball joint 22 or the like projecting from the rear of the vehicle. A small amount of slack is left in the rope to allow the trailer to move up or down independently of the vehicle when the trailer is pivoted to the front of the vehicle. The rope will also prevent the trailer from coming into contact with the side of the vehicle, for instance, when traversing rough country.

Figure 2:
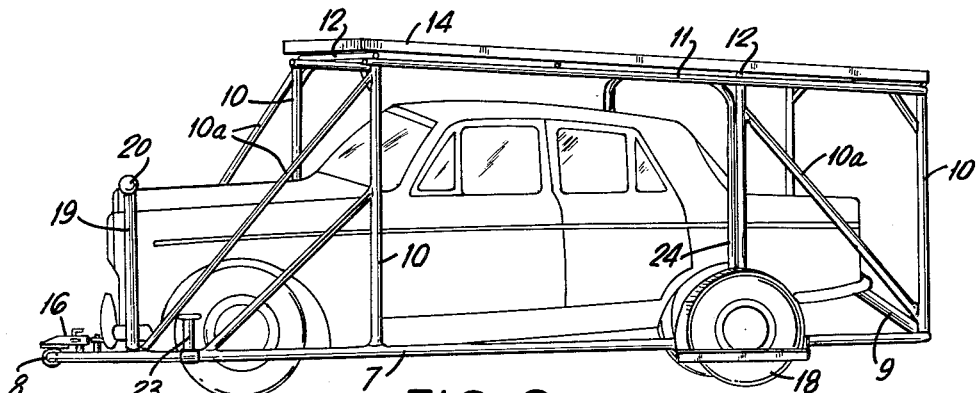

The front of the trailer may have guide means 19 which project upwards from the front of the side rails of the trailer to enable the driver of the vehicle to more easily judge the position of the front of the said trailer. If desired a light 20 or the like may surmount the guide means as an aid to night driving. Swivelling support members 23 are also attached to the front of the side rails 7 of the trailer, these support members being normally in an upright position as is shown for instance in FIGURE 2 when the trailer is connected to the motor vehicle, but may be pivoted downwards and locked in position so that the trailer can be unhitched from the motor vehicle and the trailer frame retained in the desired horizontal position by a suitable adjustment of the support members 23.

Normally the platform 14 will carry any load required to be transported, but if necessary the rear of the trailer can also be extended and a suitable tray or the like built thereon to carry additional loads.

To hitch the trailer to the motor vehicle the front of the trailer is lowered so that the front cross member 8 rests on the ground thereby allowing the vehicle to be backed into the interior of the trailer, whereupon the front of the trailer can be raised and the trailer hitching socket attached to the front of the vehicle. The rear stabilizing means is then connected as previously described and the trailer is ready to be driven away. Because the trailer is connected to the front of the vehicle, the trailer will not unduly interfere with the steering of the vehicle as is the case when a trailer is connected to the rear of the vehicle. Further, because the rear of the trailer can move up or down in relation to the motor vehicle, the driver of the vehicle can traverse rough country without detriment to either the trailer or the vehicle.

If desired the trailer can still be used as a normal trailer in that the hitching socket 16 can be attached to a ball socket at the rear of the vehicle, so that the trailer can be towed in the previously known manner. Planks or other auxiliary means can be laid across the side rails 7 to form a temporary platform, this being particularly useful in carrying long loads such as lengths of timber and the like. Because of the particular construction of the trailer it can also, if necessary, be used as a portable garage for the car by covering in the side of the trailer with canvas or the like so that the trailer can be driven to the particular required location and the vehicle left inside of the trailer. If desired the top platform 14 can also be used as a form of living space such as by erecting a canopy or the like thereon.

The terms and expressions which are employed are used as terms of description, it is recognized, though, that various modifications are possible within the scope of the invention claimed.

What is claimed is:

1. A trailer adaptable for attachment to a motor vehicle for being towed by said vehicle comprising a towing frame, said towing frame having a rectangular configuration whose long and short dimensions respectively exceed the corresponding longer and short dimensions of said motor vehicle, said towing frame comprising a pair of substantially parallel lower side rails and a pair of substantially parallel front and rear cross members for linking the respective pairs of ends of said side rails to provide said rectangular configuration, said towing frame being disposed in a horizontal plane near the bottom of said motor vehicle, a carrier frame, comprising respectively at least a pair of spaced parallel disposed support members extending upwardly from said side rails an amount beyond the roof of said vehicle, a pair of substantially parallel upper side rails to which said support members are attached and a pair of cross members for linking said upper side rails, ground wheels for carrying said frames, means for pivotally attaching said front cross member to the front of said motor vehicle and means attachable to respective intermediate points on said lower side rails and adapted to be attached to the rear of said vehicle for retaining said trailer in a predetermined position relative to said towing vehicle.

2. A trailer as defined in claim 1 and further including yoke means comprising a substantially U-shaped member attached at its ends to said lower side rails respectively and passing over said vehicle.

3. A trailer as defined in claim 2 wherein said means for pivotally attaching said front cross member to the front of said vehicle comprises a sleeve engaging said front cross member and latching socket attached to and projecting rearwardly from said sleeve.

4. A trailer as defined in claim 2 wherein said retaining means comprises a ball joint adapted to be attached to and to project from the rear of said vehicle and a rope whose center is latched around said ball joint and whose ends are attached to said lower side rails.

5. A trailer as defined in claim 4 and further including guide means, said guide means comprising a pair of members respectively projecting upwardly from the front ends of said lower side rails.

6. A trailer as defined in claim 5 and further including respective pivotally mounted support members normally extending upwardly from the fronts of said lower side rails and adapted to be pivoted downwardly and locked to enable the retaining of the trailer in a desired horizontal position.

References Cited by the Examiner

UNITED STATES PATENTS

| 1,548,527 | 8/25 | Hilgren. | |
|---|---|---|---|
| 2,726,097 | 12/55 | Darrough | 280—458 X |
| 2,838,325 | 6/58 | Begin | 280—432 |
| 2,902,184 | 9/59 | Buckner | 214—392 |

FOREIGN PATENTS

| 856,005 | 3/40 | France. |
|---|---|---|
| 1,250,559 | 11/59 | France. |

BENJAMIN HERSH, *Primary Examiner.*

LEO FRIAGLIA, *Examiner.*